US012023718B2

(12) United States Patent
McGuire et al.

(10) Patent No.: US 12,023,718 B2
(45) Date of Patent: Jul. 2, 2024

(54) APPARATUS FOR CLEANING A SURFACE WITH A LIQUID JET AND RELATED METHODS

(71) Applicant: Path Environmental Technology, LLC, Houston, TX (US)

(72) Inventors: Adam McGuire, The Woodlands, TX (US); Robert O'Brien, Katy, TX (US); Kelan McElduff, Fair Haven, NJ (US)

( * ) Notice: Subject to any disclaimer, the term of this patent is extended or adjusted under 35 U.S.C. 154(b) by 271 days.

(21) Appl. No.: 17/848,912

(22) Filed: Jun. 24, 2022

(65) Prior Publication Data

US 2022/0410228 A1 Dec. 29, 2022

Related U.S. Application Data

(60) Provisional application No. 63/280,447, filed on Nov. 17, 2021, provisional application No. 63/214,759, filed on Jun. 24, 2021.

(51) Int. Cl.
*B08B 9/047* (2006.01)
*B05B 1/10* (2006.01)
(Continued)

(52) U.S. Cl.
CPC ................ *B08B 9/047* (2013.01); *B05B 1/10* (2013.01); *B05B 15/652* (2018.02); *B05B 15/72* (2018.02);
(Continued)

(58) Field of Classification Search
None
See application file for complete search history.

(56) References Cited

U.S. PATENT DOCUMENTS 3,874,594 A 4/1975 Hatley
5,351,885 A 10/1994 Manabe
(Continued)

FOREIGN PATENT DOCUMENTS

CN 201969715 U 9/2011
CN 104259164 B 1/2015
(Continued)

*Primary Examiner* — Rita P Adhlakha

(57) ABSTRACT

Apparatus for cleaning a surface with a liquid jet, the apparatus having: a primary fluid conduit having a longitudinal axis and two ends, a fluid-intake end and a fluid-exit end; a first motor-driven drive assembly configured to engage the primary fluid conduit and turn the primary fluid conduit about the primary-fluid-conduit longitudinal axis; a first motor configured to engage the first motor-driven drive assembly; a section of the primary fluid conduit being inside of an adjacent penetration sleeve; a section of the penetration sleeve being inside of a piston sleeve; the piston sleeve configured to engage the penetration sleeve and move the penetration sleeve back and forth along a penetration-sleeve linear path over a primary-fluid-conduit exterior surface; an actuator configured to engage the piston sleeve and move piston sleeve back and forth along the piston-sleeve linear path; a penetration-sleeve end being attached to an extension sleeve that has a first end and a second end; the extension-sleeve second end being attached to a swivel rod that has a first end and a second end; the primary-fluid-conduit fluid-exit end being attached to a fixed nozzle having a first end and a second end; the fixed-nozzle second end being attached to a swivel nozzle; the swivel-rod second end being attached to the swivel nozzle; the swivel nozzle configured to pivot between a fully extended position and a fully retracted position as the swivel rod respectively extends and retracts as the penetration sleeve moves back and forth; the swivel nozzle being attached to a nozzle pipe; the nozzle pipe being attached to a nozzle configuration that is config-
(Continued)

ured to open and close a flapper door having a fluid exit orifice; and a continuous fluid-flow channel that extends from the primary-fluid-conduit fluid-intake end through the swivel nozzle.

17 Claims, 16 Drawing Sheets

(51) Int. Cl.

| | |
|---|---|
| ***B05B 15/652*** | (2018.01) |
| ***B05B 15/72*** | (2018.01) |
| ***B08B 3/04*** | (2006.01) |
| ***B08B 9/049*** | (2006.01) |
| ***B08B 9/093*** | (2006.01) |
| ***B08B 13/00*** | (2006.01) |

(52) U.S. Cl.
CPC .............. *B08B 3/04* (2013.01); *B08B 9/0495* (2013.01); *B08B 9/093* (2013.01); *B08B 13/00* (2013.01); *B08B 2209/08* (2013.01)

(56) References Cited

U.S. PATENT DOCUMENTS

| | | | |
|---|---|---|---|
| 5,715,852 | A | 2/1998 | Jepsen |
| 5,718,382 | A | 2/1998 | Jaeger |
| 5,720,310 | A | 2/1998 | Moulder |
| 5,896,871 | A | 4/1999 | Larsen |
| 5,947,387 | A | 9/1999 | Zink |
| 6,021,793 | A | 2/2000 | Moulder |
| 6,039,056 | A | 3/2000 | Verbeek |
| 6,213,135 | B1 | 4/2001 | Moulder |
| 7,044,144 | B2 | 5/2006 | Hebert |
| 7,089,949 | B1 | 8/2006 | Rogerson |
| 7,300,000 | B2 * | 11/2007 | Kitamura .............. B05B 7/0441 239/263.1 |
| 7,713,359 | B2 | 5/2010 | Jinback |
| 8,176,883 | B2 | 5/2012 | Brown |
| 8,181,890 | B2 | 5/2012 | Shawn |
| 9,061,329 | B2 | 6/2015 | Ligiero Vargas |
| 9,604,265 | B2 * | 3/2017 | Schmit .................. B08B 9/0936 |
| 10,569,314 | B2 | 2/2020 | Hengen |
| 10,632,512 | B2 | 4/2020 | DesOrmeaux |
| 2004/0089329 | A1 | 5/2004 | Bijster |
| 2015/0377746 | A1 | 12/2015 | Mineo |
| 2018/0236507 | A1 | 8/2018 | Ligiero |

FOREIGN PATENT DOCUMENTS

| | | | |
|---|---|---|---|
| CN | 204107942 | U | 1/2015 |
| DE | 102010010419 | A1 | 9/2011 |
| DE | 102012011788 | A1 | 12/2013 |
| DE | 102017115837 | A1 | 1/2019 |
| EP | 0619148 | B1 | 10/1994 |
| EP | 3517226 | A2 | 7/2019 |
| FR | 2920676 | B1 | 3/2009 |
| GB | 2096455 | B | 10/1982 |
| GB | 2231487 | B | 11/1990 |
| KR | 101224010 | B1 | 1/2013 |
| KR | 101298090 | B1 | 8/2013 |
| KR | 101535266 | B1 | 7/2015 |
| KR | 20160026211 | A | 3/2016 |

* cited by examiner

APPARATUS FOR CLEANING A SURFACE WITH A LIQUID JET AND RELATED METHODS

CROSS-REFERENCE TO RELATED APPLICATIONS

This patent application claims priority to U.S. provisional patent application No. 63/280,447 filed on Nov. 17, 2021; the subject matter of which is incorporated into this application in its entirety.

This patent application also claims priority to U.S. provisional patent application No. 63/214,759 filed on Jun. 24, 2021; the subject matter of which is incorporated into this application in its entirety.

BACKGROUND OF THE INVENTION

Storage tanks, such as those used to store crude oil or other carbon-containing fluids, are well known. There remains a need for an apparatus that can be used to clean the interior walls of storage tanks that are used to store crude oil or other carbon-containing fluids.

BRIEF SUMMARY OF THE INVENTION

Apparatus for cleaning a surface with a liquid jet, the apparatus having: a primary fluid conduit having a longitudinal axis and two ends, a fluid-intake end and a fluid-exit end; a first motor-driven drive assembly configured to engage the primary fluid conduit and turn the primary fluid conduit about the primary-fluid-conduit longitudinal axis; a first motor configured to engage the first motor-driven drive assembly; a section of the primary fluid conduit being inside of an adjacent penetration sleeve; a section of the penetration sleeve being inside of a piston sleeve; the piston sleeve configured to engage the penetration sleeve and move the penetration sleeve back and forth along a penetration-sleeve linear path over a primary-fluid-conduit exterior surface; an actuator configured to engage the piston sleeve and move piston sleeve back and forth along the piston-sleeve linear path; a penetration-sleeve end being attached to an extension sleeve that has a first end and a second end; the extension-sleeve second end being attached to a swivel rod that has a first end and a second end; the primary-fluid-conduit fluid-exit end being attached to a fixed nozzle having a first end and a second end; the fixed-nozzle second end being attached to a swivel nozzle; the swivel-rod second end being attached to the swivel nozzle; the swivel nozzle configured to pivot between a fully extended position and a fully retracted position as the swivel rod respectively extends and retracts as the penetration sleeve moves back and forth; the swivel nozzle being attached to a nozzle pipe; the nozzle pipe being attached to a nozzle configuration that is configured to open and close a flapper door having a fluid exit orifice; and a continuous fluid-flow channel that extends from the primary-fluid-conduit fluid-intake end through the swivel nozzle.

DETAILED DESCRIPTION OF THE INVENTION

Figure 1:
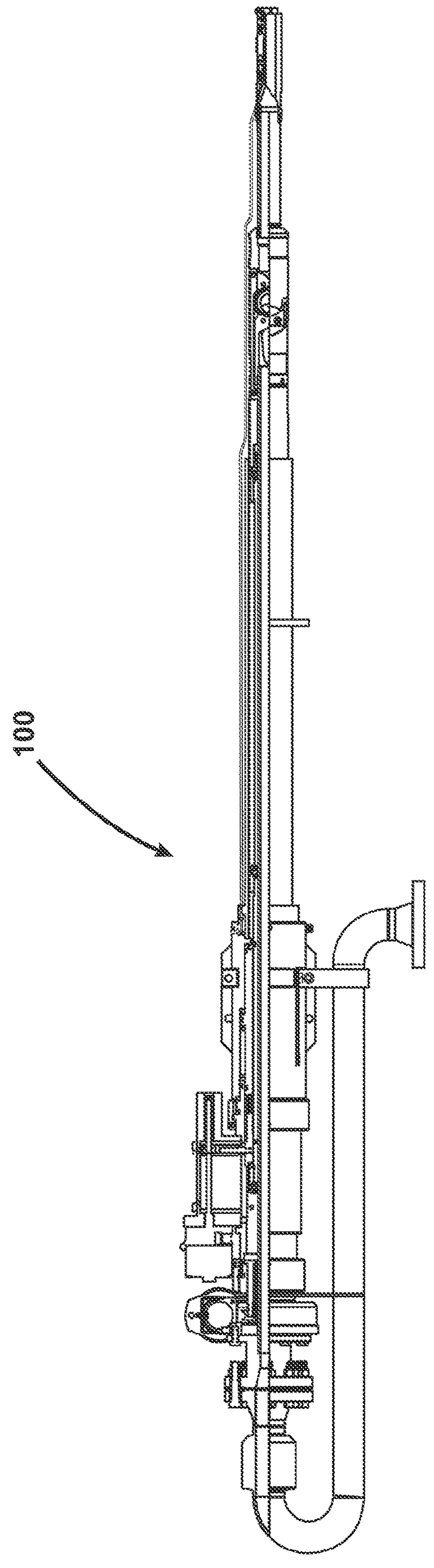
FIG. 1 is a side partial cross-sectional view of an embodiment.
Figure 2:
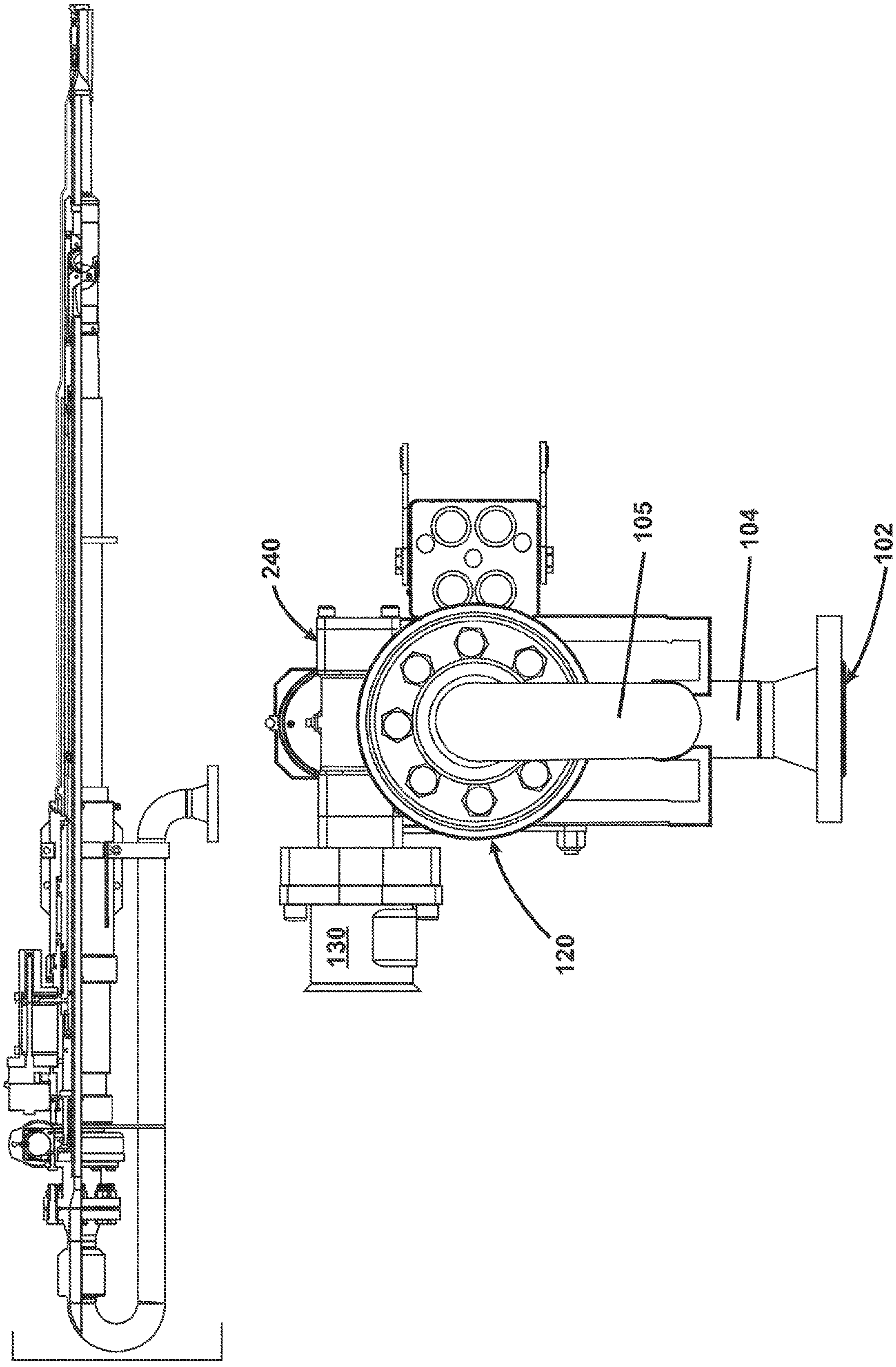
FIG. 2 is an end view of an embodiment.
Figure 3:
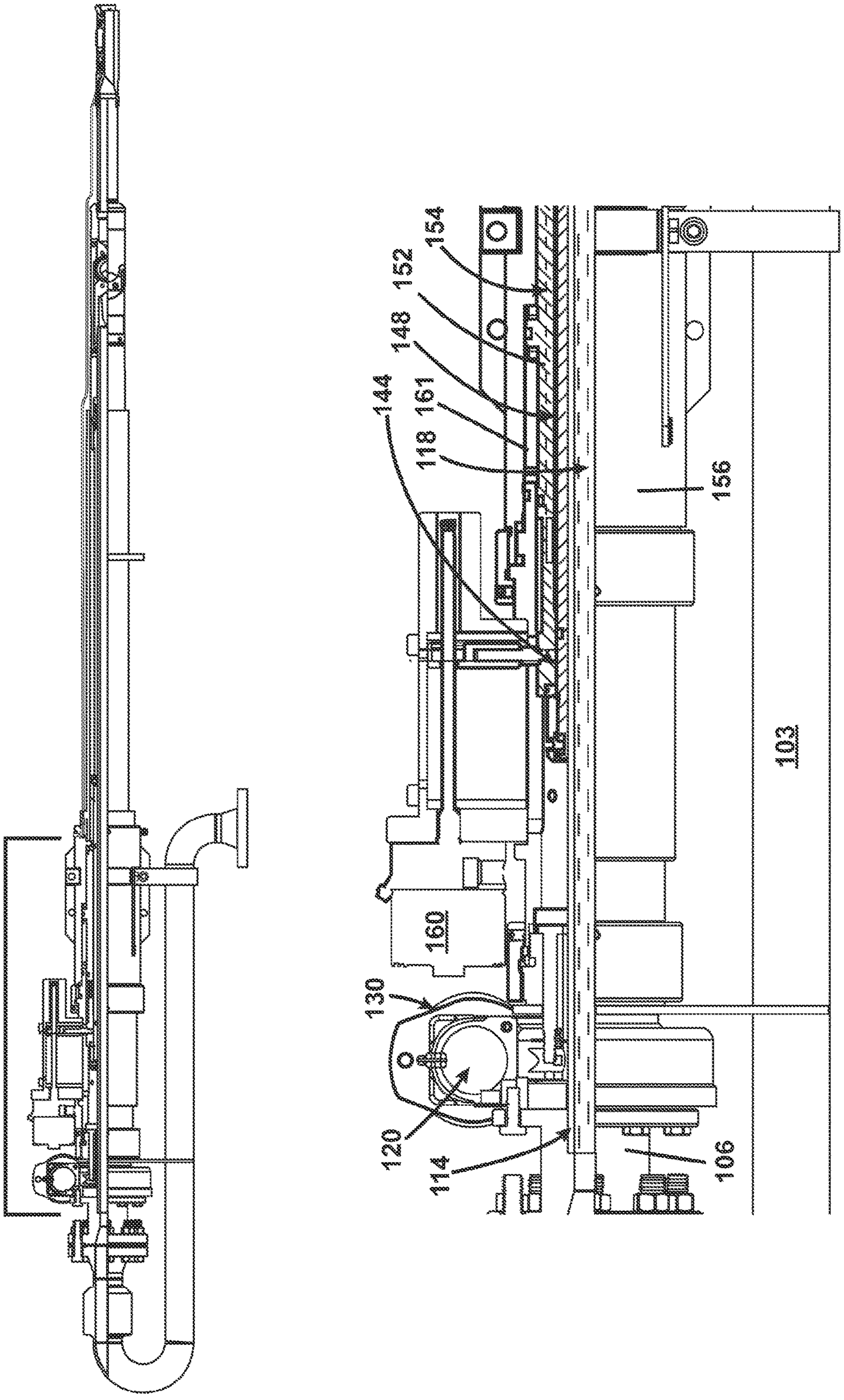
FIG. 3 is a side partial cross-sectional view of an embodiment.
Figure 4:
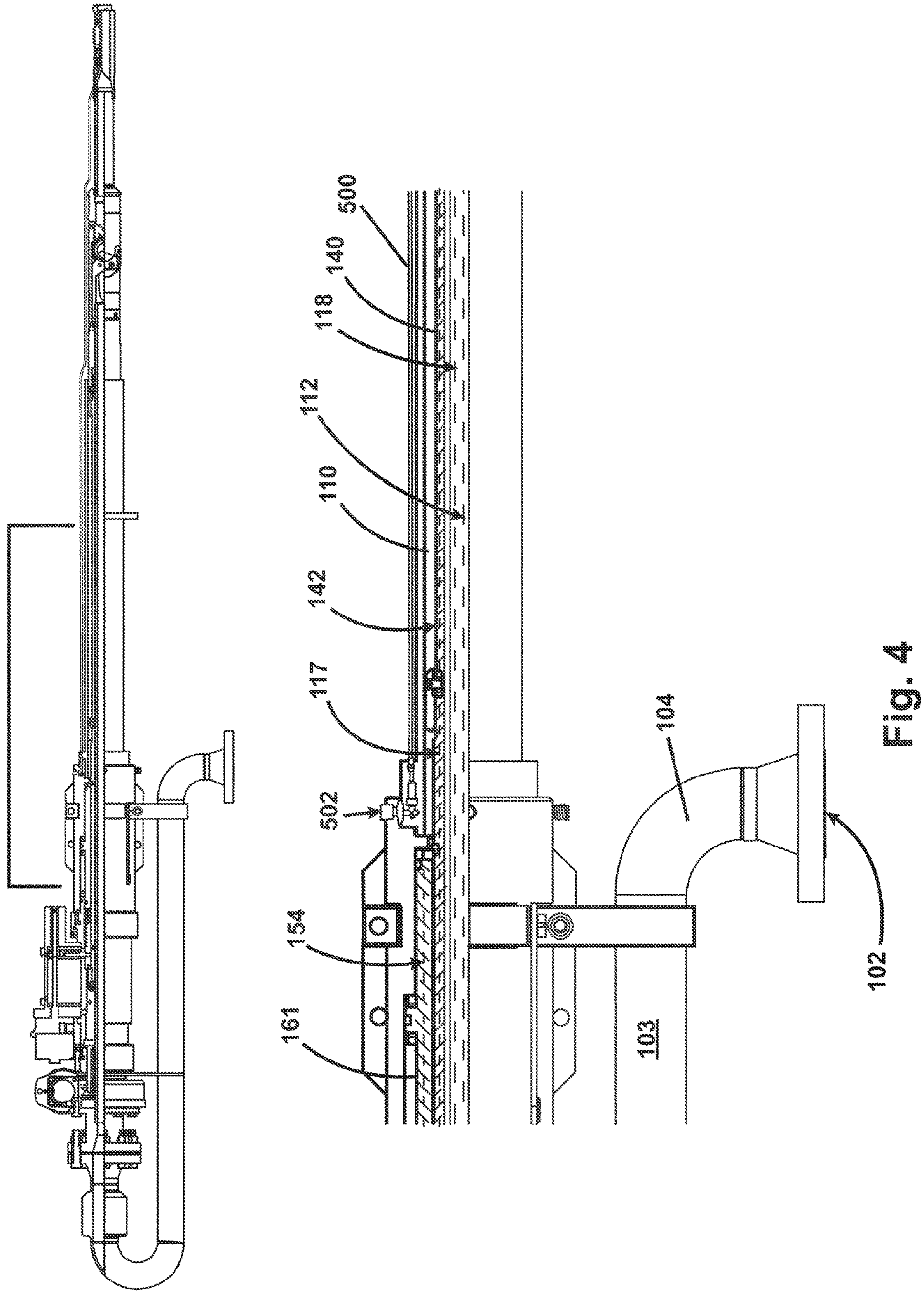
FIG. 4 is a side partial cross-sectional view of an embodiment.
Figure 5:
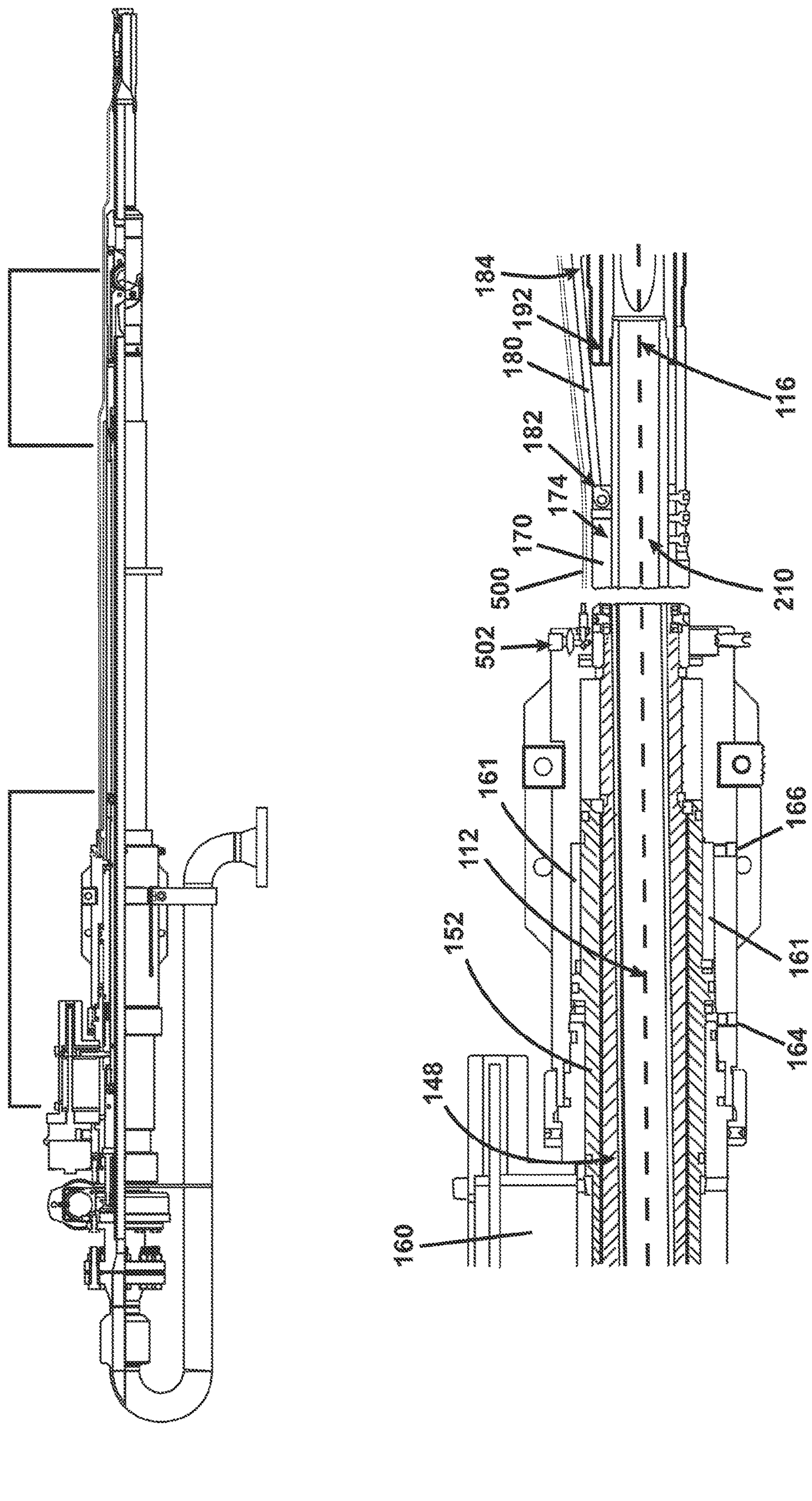
FIG. 5 is a side partial cross-sectional view of an embodiment.
Figure 6:
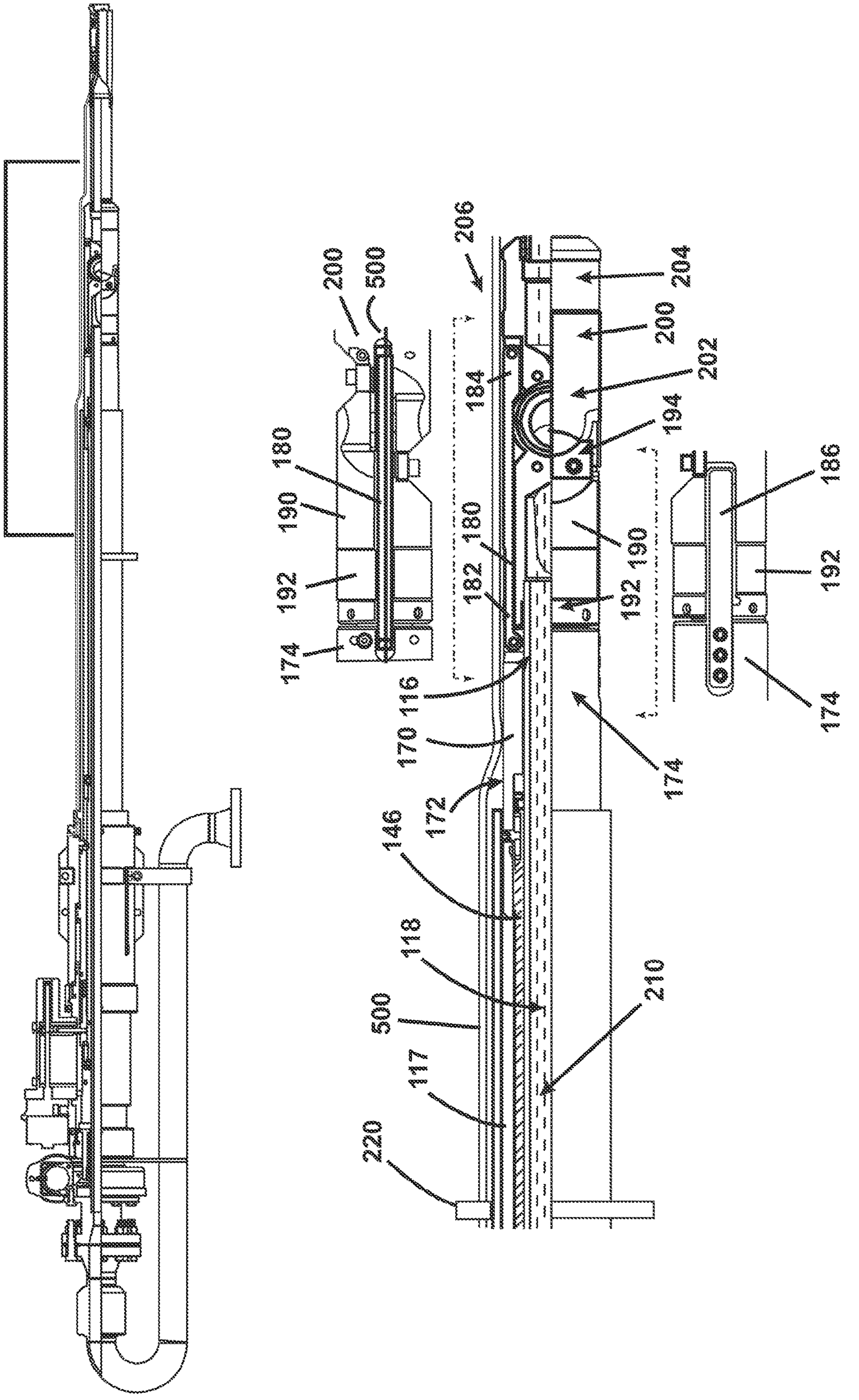
FIG. 6 is a side partial cross-sectional view of an embodiment that also includes top and bottom partial views.
Figure 7:
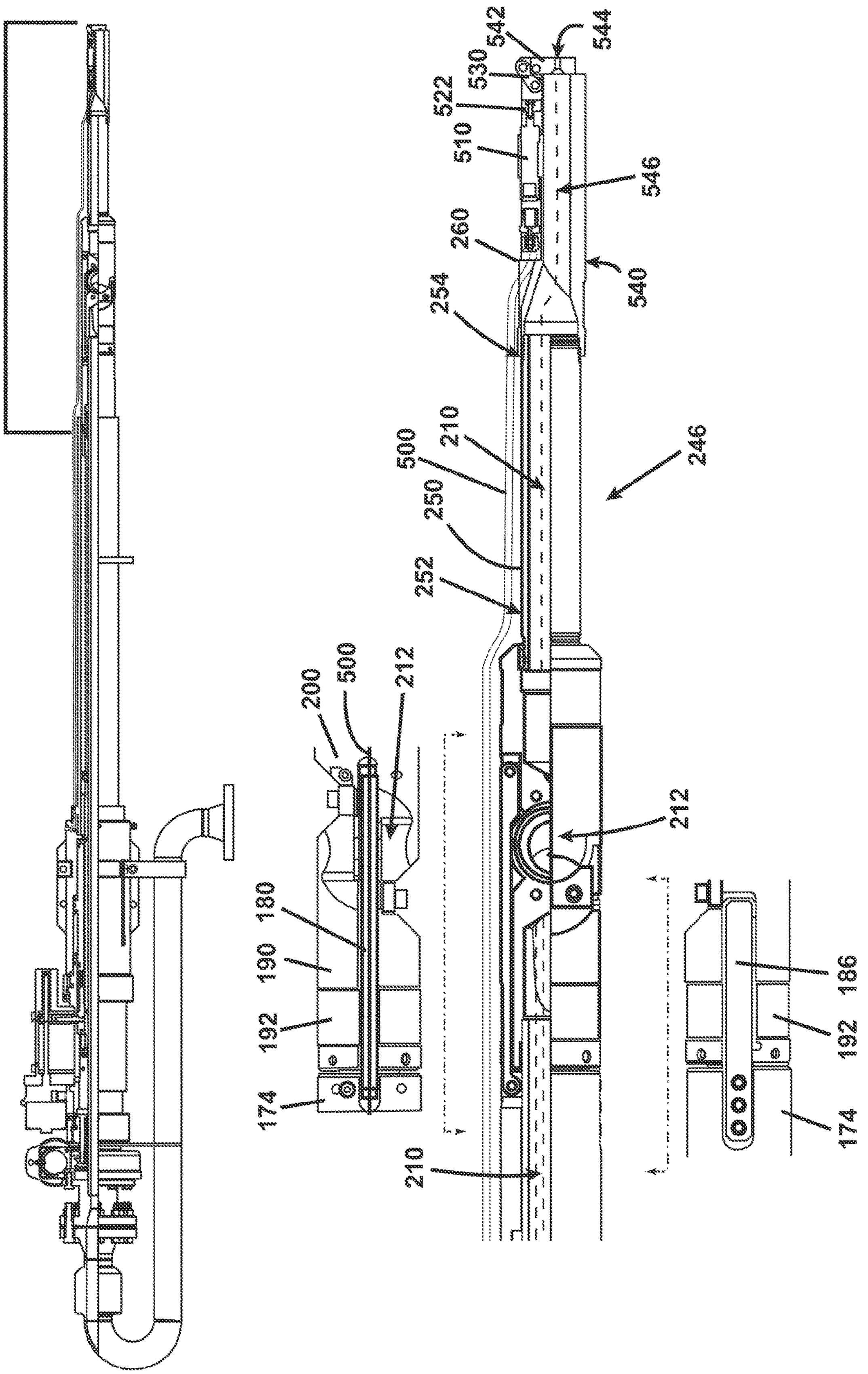
FIG. 7 is a side partial cross-sectional view of an embodiment that also includes top and bottom partial views.
Figure 8:
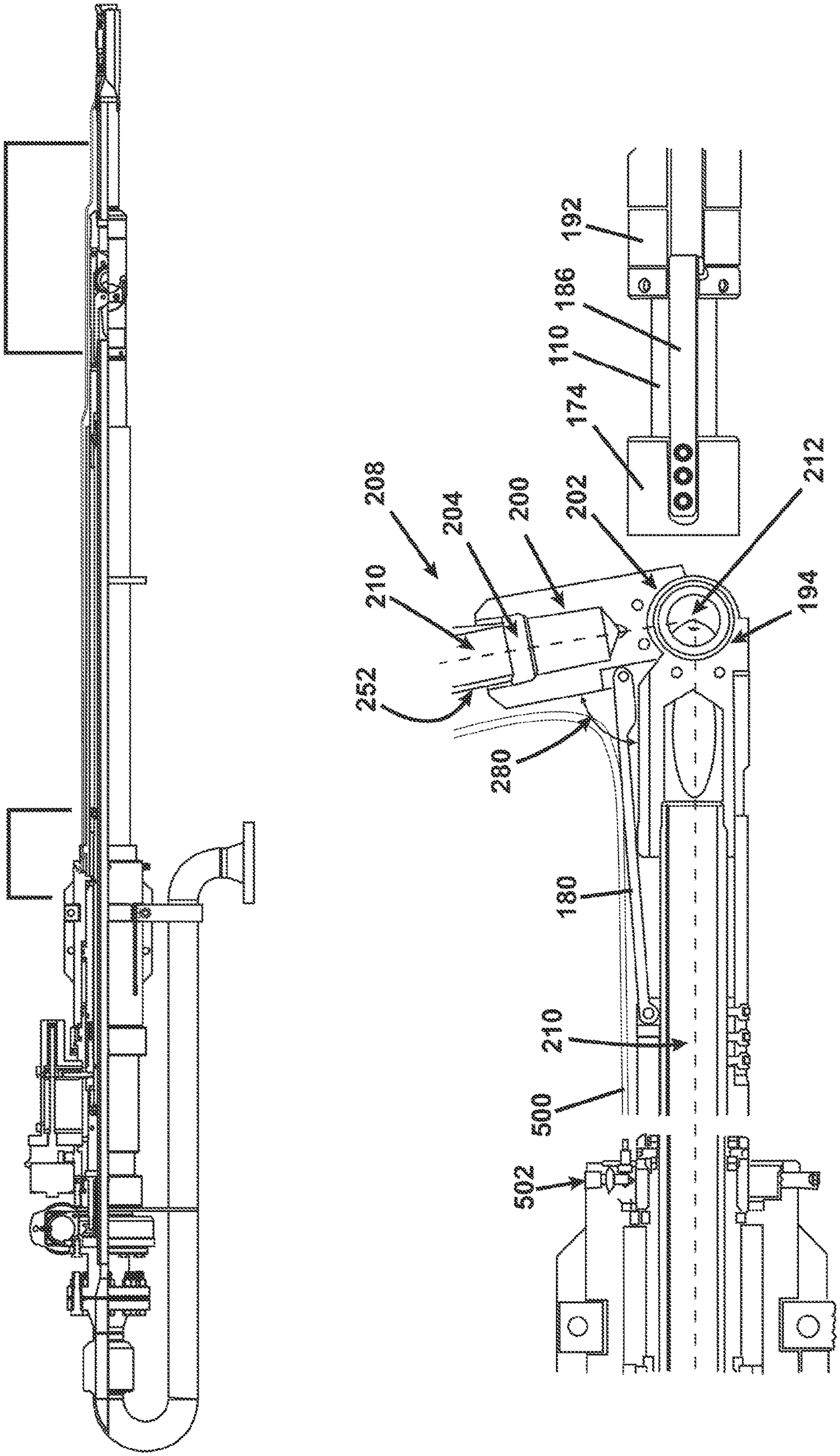
FIG. 8 is a side partial cross-sectional view of an embodiment that also includes a bottom partial view.

Embodiments are generally directed to an apparatus configured to receive pressurized fluid from an outside source and subsequently discharge it as a pressurized liquid jet that can be used to clean a surface by blasting unwanted debris off of the soiled surface. Very generally, after receiving the incoming pressurized fluid through an initial fluid-intake port, the fluid then travels within the apparatus along a fluid-flow path to a nozzle configuration having an exit orifice from which the fluid is discharged as a pressurized liquid jet. And although, in embodiments, the main body of the apparatus remains in a fixed mounted position while in use, the apparatus is configured to allow a user to use a remote control to move and thereby aim the nozzle tip in a variety of directions in three-dimensional space to facilitate directing the exiting pressurized liquid jet at a variety of surface target areas.

With reference to the figures, apparatus 100 has initial fluid-intake port 102 that is configured to serve as apparatus 100's port of entry for receiving pressurized fluid originating from an outside source such as a fluid pump. Initial fluid-intake port 102 is fixedly attached to initial fluid-intake conduit 103 at initial fluid-intake conduit first end 104. At initial fluid-intake conduit 103's other end, i.e., at initial fluid-intake conduit second end 105, initial fluid-intake conduit 103 is fixedly and non-movably attached to swivel adaptor 106. Although swivel adaptor 106 is fixedly and non-movably attached to initial fluid-intake conduit second end 105 (to receive fluid flow therefrom), on its other side, as shown in the figures, swivel adaptor 106 is configured to receive primary fluid conduit 110's primary-fluid-conduit fluid-intake end 114 such that that primary-fluid-conduit fluid-intake end 114 is inset into and fixedly attached to swivel adaptor 106. This connection configuration allows fluid flow to travel from initial fluid-intake conduit second end 105, through swivel adaptor 106, into primary-fluid-conduit fluid-intake end 114, through primary fluid conduit 110, and out of primary-fluid-conduit fluid-exit end 116. As will be described further below, fluid flow then continues from primary-fluid-conduit fluid-exit end 116, into and through swivel nozzle 200, then into nozzle pipe 250, and finally out of nozzle configuration 540 as a pressurized fluid jet. In embodiments, the above fluid-flow path can be understood to be within continuous fluid-flow channel 210.

To control the degree of turning of nozzle configuration 540 about primary-fluid-conduit longitudinal axis 112 and thereby allow a user to remote controllably aim nozzle configuration 540 (and the pressurized liquid jet emitted therefrom) at a target surface, the following mechanical-configuration explanation of apparatus 100 is provided.

A portion of swivel adaptor 106, that is fixedly attached to primary-fluid-conduit fluid-intake end 114 is configured to swivel or spin freely in a first or second direction about primary-fluid-conduit longitudinal axis 112 and thereby allow the fixedly attached primary fluid conduit 110 to also swivel or spin freely, in an equal degree, in a first or second direction about primary-fluid-conduit longitudinal axis 112. Stated differently, because primary-fluid-conduit fluid-intake end 114 is fixedly inset into swivel adaptor 106, as swivel adaptor 106 swivels or spins in one direction or the other about primary-fluid-conduit longitudinal axis 112, primary fluid conduit 110 also swivels or spins about primary-fluid-conduit longitudinal axis 112 to the same degree (as swivel adaptor 106) because the two are fixedly attached to one another and swivel or spin together as a single unit.

To controllably turn primary fluid conduit 110 any number of degrees in a first or second direction about primary-fluid-conduit longitudinal axis 112, the turning action of primary fluid conduit 110 (about primary-fluid-conduit longitudinal axis 112) is motor driven by first motor 130 and first motor-driven drive assembly 120 working in coordination. First motor 130 is configured to engage first motor-driven drive assembly 120, and motor-driven drive assembly 120 is configured to engage and thereby turn primary fluid conduit 110 any number of degrees in a first or second direction about primary-fluid-conduit longitudinal axis 112. The turning action of primary fluid conduit 110 about primary-fluid-conduit longitudinal axis 112 is reversible.

Figure 16:
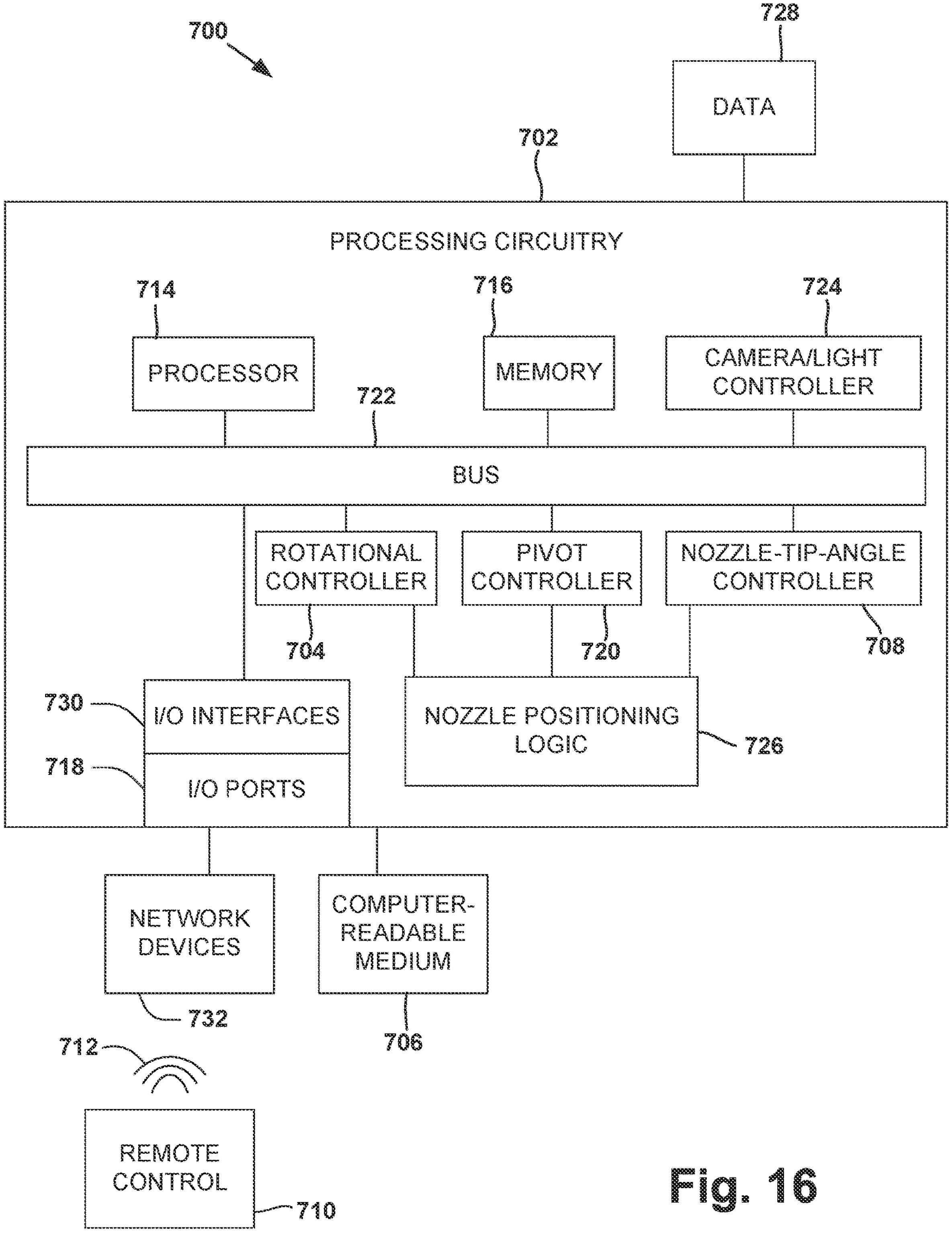
FIG. 16 is an embodiment of processing circuitry implemented as a computing system including electronic circuitry and a non-transitory, computer-readable medium storing executable logic of a rotational controller, pivot controller and a nozzle-tip-angle controller, according to the exemplary systems and/or methods disclosed.

As a non-limiting example, primary fluid conduit 110 can be controllably engaged to turn 5° in a first direction (and thereby aim nozzle configuration 540 and a pressurized liquid jet emitted therefrom) and then controllably be made to remain in that position for any period of time as desired by a user (in an effort to clean debris off of a target surface using the pressurized liquid jet emitted from the nozzle tip). Then, if a user decides that primary fluid conduit 110 and the liquid jet emitted from nozzle tip 260 should be turned back −10° (i.e., in an opposite direction to target debris that may have been missed) and keep the primary fluid conduit 110 in that position for a desired period of time (again to clean debris off of a target surface), then a user can controllably do so by using a remote control 710 (FIG. 16), optionally over a wireless communication channel 712 (FIG. 16).

First motor 130 can be any known type of motor, and in embodiments, useful motors include a hydraulic, pneumatic, or electric motor(s). Due to the configuration of first motor 130 and first motor-driven drive assembly 120 with one another, when first motor 130 is remotely activated by a user (using remote control 710), first motor 130 engages first motor-driven drive assembly 120, that in embodiments includes a gear box (not shown), to thereby cause primary fluid conduit 110 to turn any number of degrees in a first or second direction about primary-fluid-conduit longitudinal axis 112. In embodiments, primary fluid conduit 110 can turn continuously in a first or second direction, and in embodiments, primary fluid conduit 110 can be turned continuously any number of degrees in a first direction about primary-fluid-conduit longitudinal axis 112 and then subsequently turned continuously any number of degrees in the opposite or second direction about primary-fluid-conduit longitudinal axis 112. That is to say that the directionality of the turning action of primary fluid conduit 110 is reversible; for example, primary fluid conduit 110 can be turned in a first direction any number of degrees, and then if a user provides input into remote control 710 to do so, primary fluid conduit 110 can be made to reverse direction and turn in an opposite second direction any number of degrees.

The purpose of causing primary fluid conduit 110 to turn any number of degrees in a first or second direction about primary-fluid-conduit longitudinal axis 112 is that, as shown in the figures, nozzle pipe 250 and nozzle configuration 540 (that is fixedly attached thereto) is indirectly mechanically attached to primary fluid conduit 110, and as primary fluid conduit 110 turns in a first or second direction about primary-fluid-conduit longitudinal axis 112, so does nozzle configuration 540 to an equal degree. This is what allows a user to controllably turn nozzle configuration 540 any number of degrees in one direction or another about primary-fluid-conduit longitudinal axis 112; in other words, this is how a user can turn and thereby aim nozzle configuration 540 (and the pressurized liquid jet emitted therefrom) at a target surface. The purpose of controllably turning primary fluid conduit 110 is to give a user control over the directionality of a pressurized liquid jet being emitted from nozzle configuration 540.

When swivel nozzle 200 is in swivel-nozzle fully extended position 206 and causes nozzle configuration 540 to be substantially in line with primary-fluid-conduit longitudinal axis 112, turning primary fluid conduit 110 about primary-fluid-conduit longitudinal axis 112 has little or no effect on changing the directionality of the pressurized fluid jet being emitted from nozzle configuration 540. But when swivel nozzle 200 is in swivel-nozzle fully retracted position 208 (thereby creating at least a 90° angle or elbow relative to primary-fluid-conduit longitudinal axis 112) or any other swivel nozzle angular position between: i) swivel-nozzle fully extended position 206, and ii) swivel-nozzle fully retracted position 208, turning primary fluid conduit 110 about primary-fluid-conduit longitudinal axis 112 notably changes the position of nozzle configuration 540 and therefore the directionality of the pressurized liquid jet emitted from nozzle configuration 540. In embodiments that allow swivel-nozzle fully retracted position 208 to be in at least a 90° angle relative to a swivel-nozzle fully extended position 206 of 0°, nozzle configuration 540 through controllably turning primary fluid conduit 110 in combination with controllably determining the angle degree 280 (from 0° to >90°) of swivel nozzle 200 (as will be further described below) can at least be aimed in substantially any direction within a hemisphere of directions.

Rotational position sensor 240 is configured to monitor the degree of rotation of primary fluid conduit 110 relative to a neutral starting position of 0°. Stated differently, rotational position sensor 240 monitors the degree to which primary fluid conduit 110 has turned in a first or second direction relative to a neutral starting position of 0° (e.g. "+"

degree of rotation in a first direction and a "–" degree of rotation in a second opposite direction).

To control the angular position of nozzle configuration 540 by retracting swivel nozzle 200 from swivel-nozzle fully extended position 206 (i.e., 0°) to swivel-nozzle fully retracted position 208 (e.g., >90°) or any angle therebetween (identified as variable angle 280 in the figures, e.g., angle 280 between a fully extended position 206 of 0° to a fully retracted position 208 of >90°) and thereby allow a user to use remote control 710 to aim nozzle configuration 540 (and the pressurized liquid jet emitted therefrom), the following mechanical-configuration explanation of apparatus 100 is provided.

Very generally, retracting or extending swivel nozzle 200 (and thereby indirectly altering the angle of nozzle configuration 540 to an equal degree) is achieved by retracting or extending penetration sleeve 140 along penetration sleeve linear path 142 and thereby indirectly pulling or pushing on swivel rod 180, which in turn pulls or pushes on swivel nozzle second end 204 causing swivel nozzle second end 204 to retract or extend and thereby alter angle 280.

As shown in the figures, penetration sleeve 140 is adjacent to and surrounds a majority portion of primary-fluid-conduit exterior surface 172; more specifically, the general section of primary fluid conduit 110 that is positioned inside of adjacent penetration sleeve 140 is generally shown in the figures as section 118. Penetration sleeve 140 is configured to move longitudinally back and forth over primary-fluid-conduit exterior surface 117 along penetration-sleeve linear path 142, and it is this back-and-forth movement of penetration sleeve 140 that causes penetration sleeve 140 to indirectly push or pull on swivel rod 180 and thereby alter angle 280 to between 0° and in embodiments to >90° as desired by a user.

As shown in the figures, piston sleeve 152 is adjacent to and surrounds exterior portion of penetration sleeve first end 144; to be clear, the general section of penetration sleeve 140 that is adjacent to and within piston sleeve 152 is generally shown in the figures as penetration-sleeve section 148. Piston sleeve is housed within piston housing 156. Piston sleeve 152 is fixedly attached to penetration sleeve 140 such that when piston sleeve 152 moves longitudinally back and forth along piston-sleeve linear path 154, penetration sleeve 140 also does so equally. As a non-limiting example, if piston sleeve 152 moves a centimeter in a first direction along piston-sleeve linear path 154, then penetration sleeve 140 also moves a centimeter in the same direction because the two sleeves 152 and 140 are fixedly attached to one another; as one moves, so does the other.

In embodiments, piston sleeve 152 is hydraulically driven back and forth along piston-sleeve linear path 154. Piston-sleeve actuator 161 receives and dispels hydraulic fluid using first-and-second actuator hydraulic fluid ports 164 and 166 to thereby drive piston sleeve 152 back and forth along piston-sleeve linear path 154. Linear position sensor 160 monitors the position of piston sleeve 152 along piston-sleeve linear path 154. The indirect effect of controllably moving piston sleeve 152 back and forth along piston-sleeve linear path 154 is that when piston sleeve 152 is in a fully retracted position, swivel nozzle 200 is also in a fully retracted position, and in embodiments results in angle 280 being an angle of >90°; likewise—when piston sleeve 152 is in a fully extended position, swivel nozzle 200 is also in a fully extended position that results in angle 280 being 0°.

Penetration-sleeve second end 146 is fixedly attached to extension sleeve 170, and more specifically at extension-sleeve first end 172. Swivel rod 180 is rotatably attached to extension-sleeve second end 174, more specifically, swivel-rod first end 182 is rotatably attached to extension-sleeve second end 174. Swivel-rod second end 184 is rotatably attached to swivel-nozzle second end 204 and is configured to push and pull on swivel-nozzle second end 204 to thereby controllably alter angle 280 as desired by a user. Nozzle bar 186 is fixedly attached to extension-sleeve second end 174 and slidably attached to fixed-nozzle first end 192; this attachment configuration causes nozzle bar 186 to ensure that as extension sleeve 170 moves back and forth (as a function of penetration sleeve 140 moving back and forth along penetration sleeve linear path 142), both extension sleeve 170 and fixed nozzle 190 are consistently guided into position by nozzle bar 186.

Figure 9:
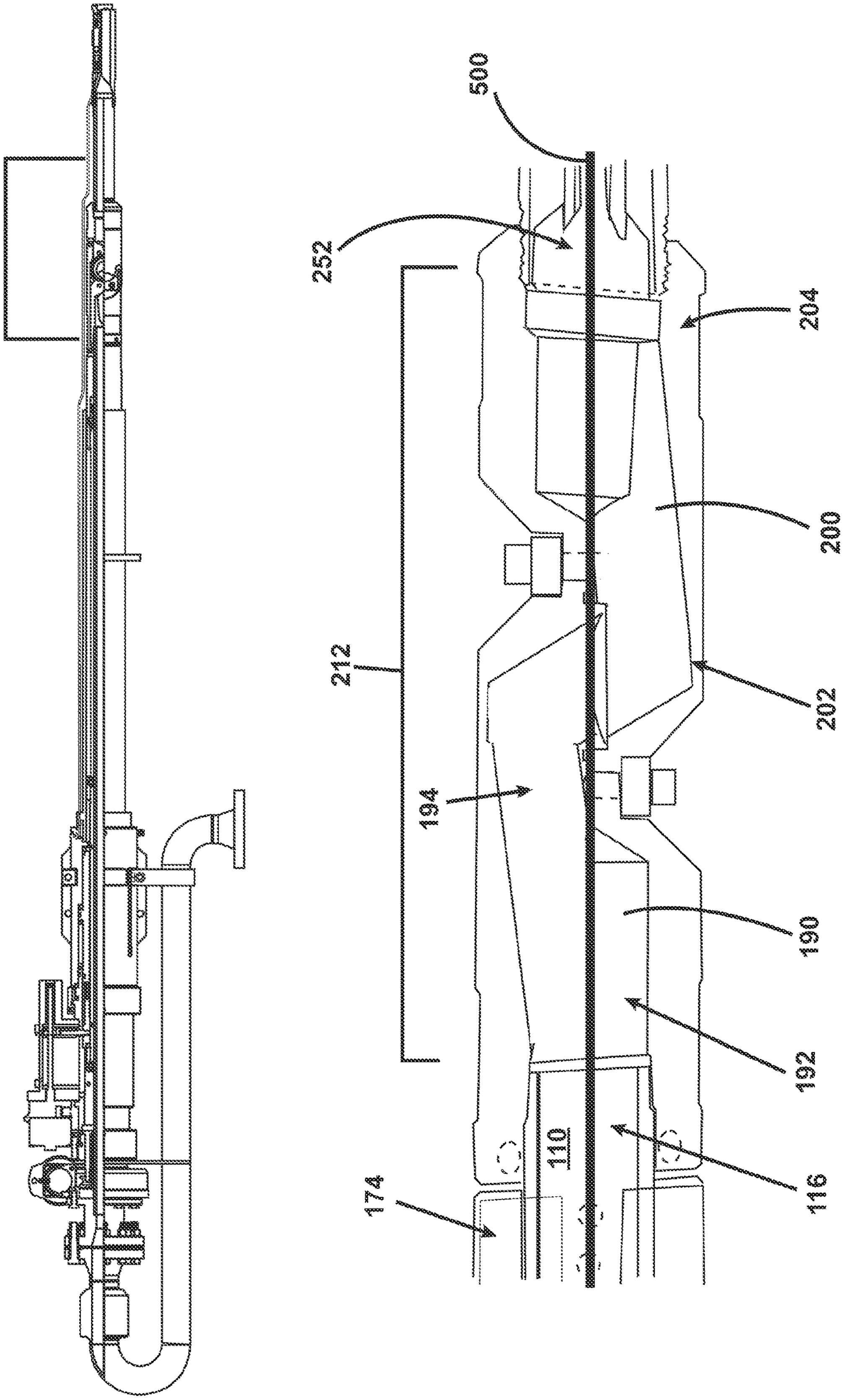
FIG. 9 is a top view of an embodiment.

As shown in the figures, when swivel nozzle 200 is in a fully extended position and angle 280 is 0°, extension-sleeve second end 174 abuts fixed nozzle first end 192. Fixed nozzle first end 192 is configured to receive primary-fluid-conduit fluid-exit end 116, and primary-fluid-conduit fluid-exit end 116 is fixedly attached therein. In embodiments, fixed nozzle 190, and specifically, fixed-nozzle first end 192 and primary-fluid-conduit fluid-exit end 116 have complimentary threading that allows fixed nozzle first end 192 to be screwed on to the exterior surface of primary-fluid-conduit fluid-exit end 116. Fixed-nozzle second end 194 is configured to seamlessly connect to swivel-nozzle first end 202 such that fluid flow out of fixed-nozzle second end 194 enters uninterrupted and seamlessly into swivel-nozzle first end 202. As shown in the figures, the connection configuration of fixed nozzle 190 and swivel nozzle 200 creates continuous fluid-flow channel non-linear section 212; as shown in FIG. 9, a top view of continuous fluid-flow channel non-linear section 212 shows that the fluid-flow channel through non-linear section 212 has a "Z"-like configuration. As fluid flow exits continuous fluid-flow channel non-linear section 212, i.e., as fluid-flow exits swivel-nozzle second end 204, fluid enters into nozzle pipe 250 and subsequently exits apparatus 100 via nozzle configuration 540. Nozzle-pipe first end 252 is fixedly attached to swivel-nozzle second end 204, and in embodiments, nozzle-pipe first end 252 and swivel-nozzle second end 204 have complimentary threading that allows the two elements to be screwed together. Likewise, nozzle-pipe second end 254 is fixedly attached to nozzle configuration 540, and in embodiments, nozzle-pipe second end 254 and nozzle configuration 540 have complimentary threading that allows the two elements to be screwed together.

Figure 13:
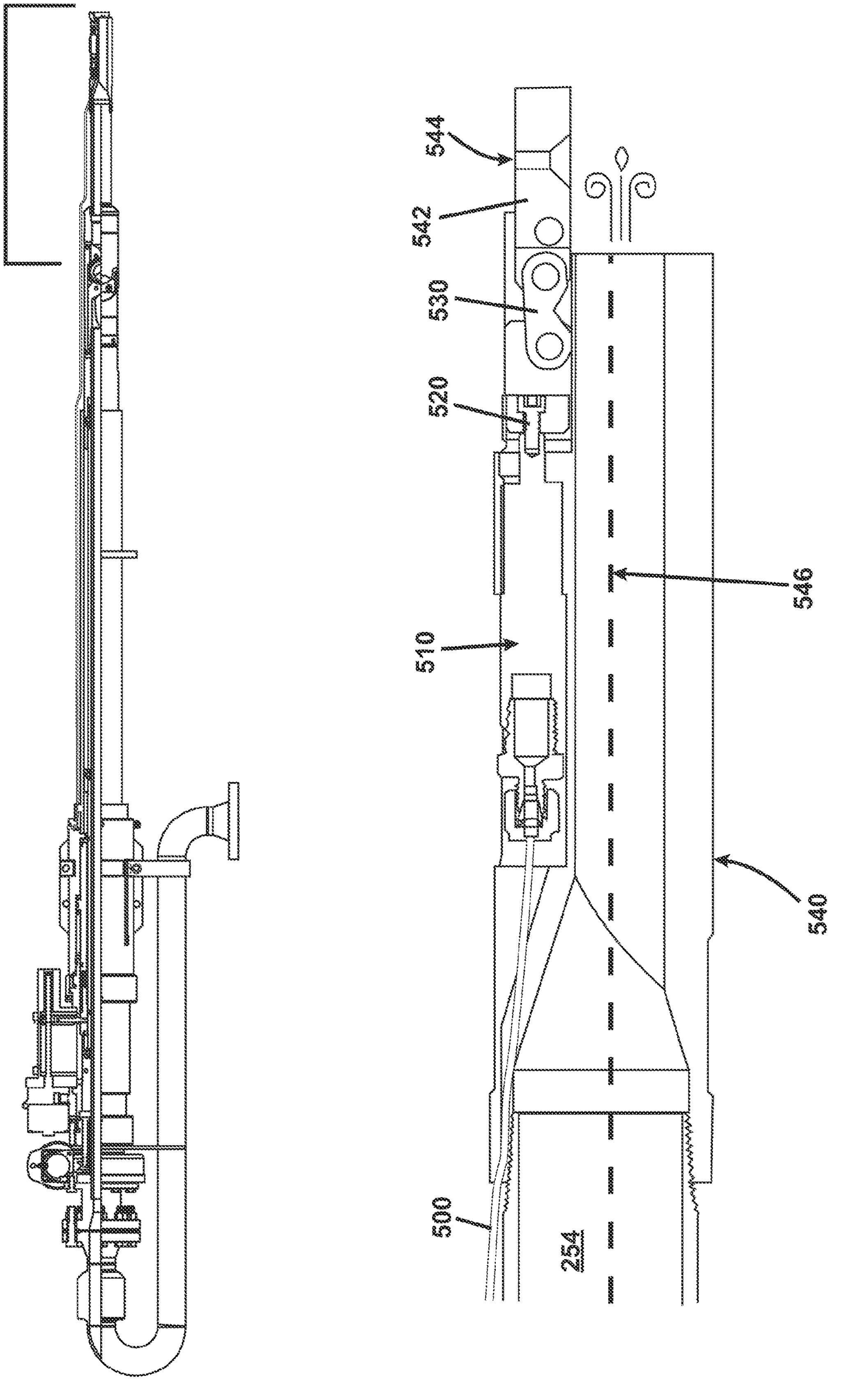
FIG. 13 is a side partial cross-sectional view of an embodiment.
Figure 14:
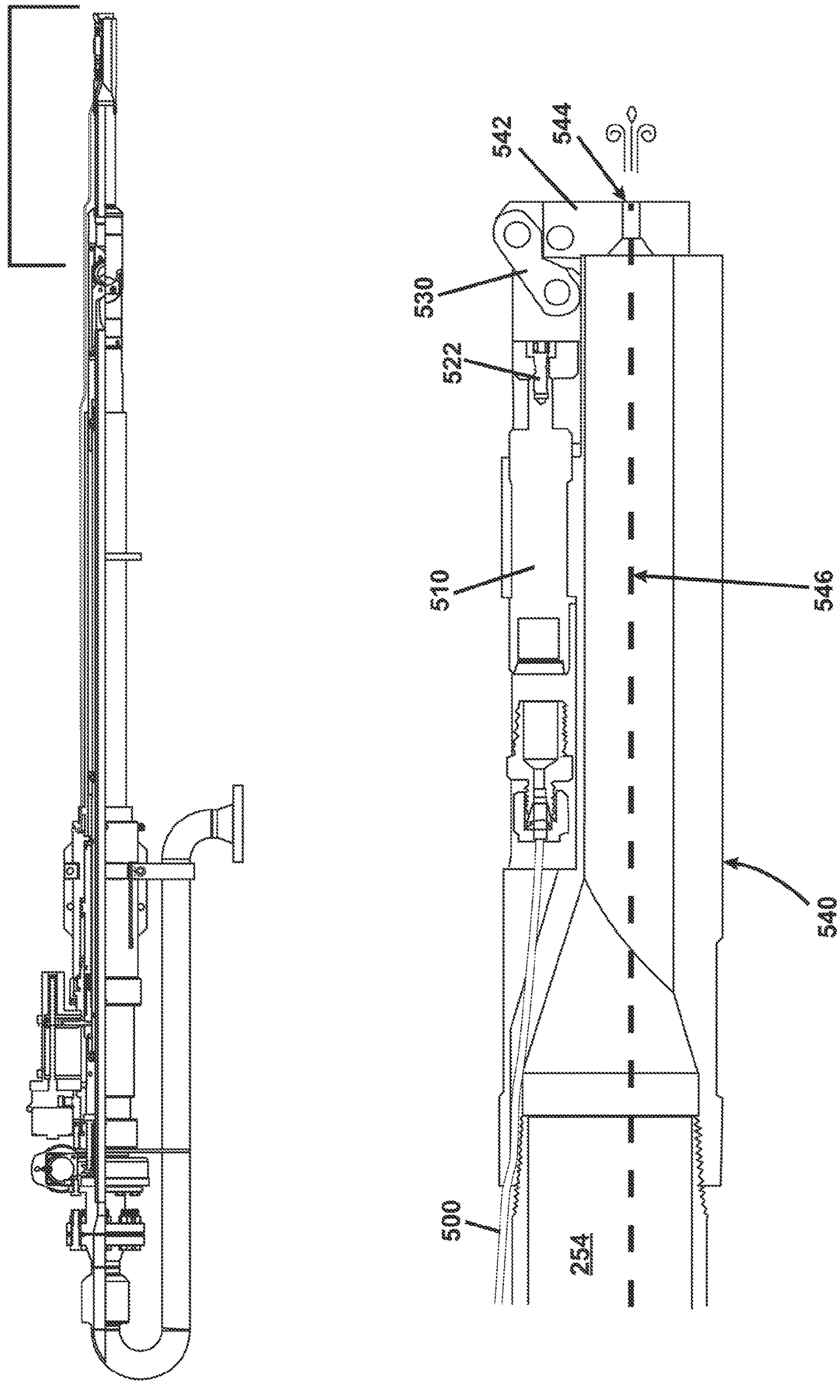
FIG. 14 is a side partial cross-sectional view of an embodiment.

As shown in FIGS. 13 and 14, as fluid flow exits from nozzle-pipe second end 254, it subsequently enters into nozzle configuration 540 and travels along nozzle-configuration fluid flow path 546 until it is subsequently emitted from nozzle configuration 540 as a pressurized liquid jet. Fluid is emitted from nozzle configuration 540 as a pressurized liquid jet in one of two ways: 1) it is either emitted from nozzle configuration 540 with flapper door 542 in an open position (as shown in FIG. 13), or 2) it is emitted from nozzle configuration 540 with flapper door 542 in a closed position and through flapper door exit orifice 544 (as shown in FIG. 14). By exiting nozzle apparatus 540 through flapper door exit orifice 544 (as shown in FIG. 14), the pressurized liquid jet has an increased pressure relative to those embodiments in which the fluid flow exits from nozzle configuration 540 with flapper door 542 in the open position (as shown in FIG. 14).

In embodiments, flapper door 542 is opened and closed hydraulically. Hydraulic fluid is introduced into hydraulic fluid port 502 and travels to piston 510 via hydraulic line

500. As hydraulic fluid is introduced into piston 510, piston rod moves from piston-rod retracted position 520 to piston-rod extended position 522. In piston-rod retracted position 520, flapper door 542 is open (as shown in FIG. 13). But as additional hydraulic fluid is introduced into piston 510, and as piston rod moves into piston-rod extended position 522, linkage element 530 pushes flapper door 542 into a closed position (as shown in FIG. 14).

Figure 15:
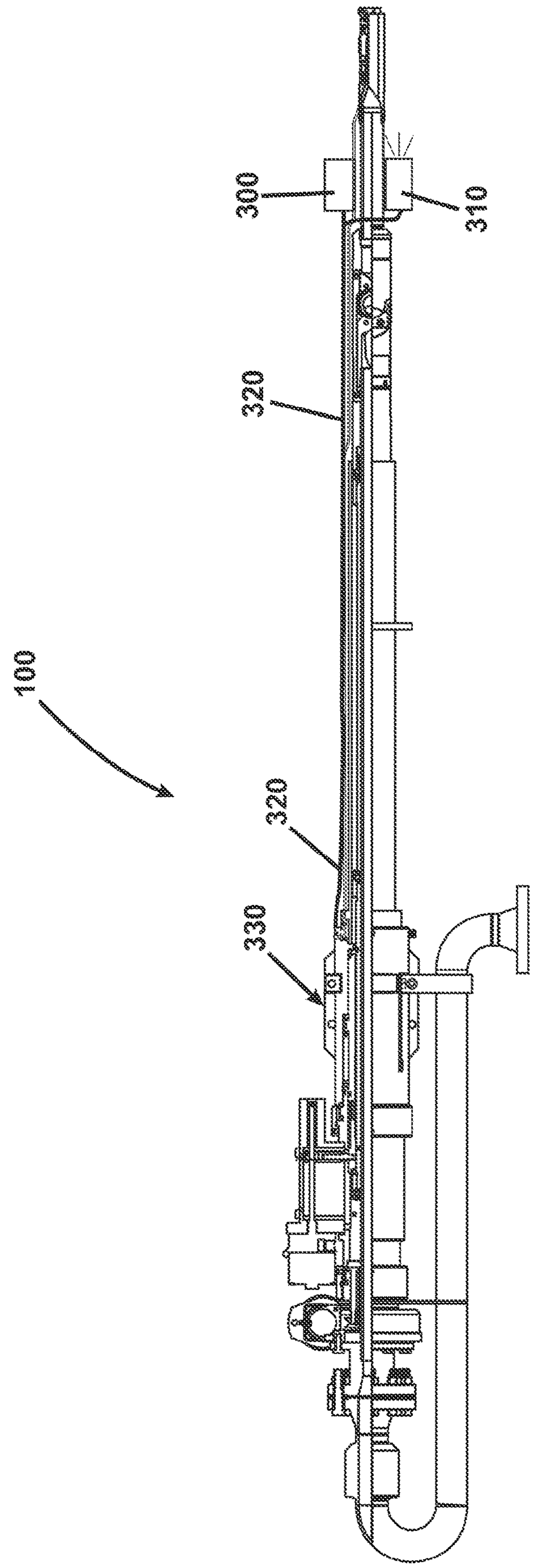
FIG. 15 is a side partial cross-sectional view of an embodiment.

In embodiments, and as shown in FIG. 15, camera 300 and lighting source 310 are attached to nozzle pipe 250 to assist a user with real-time viewing of a target surface to be cleaned by a pressurized liquid jet leaving nozzle configuration 540. Power and data cable 320 provides power to both camera 300 and lighting source 310; power and data cable 320 also transfers incoming video data from camera 300 to power/data port 330.

Figure 10:
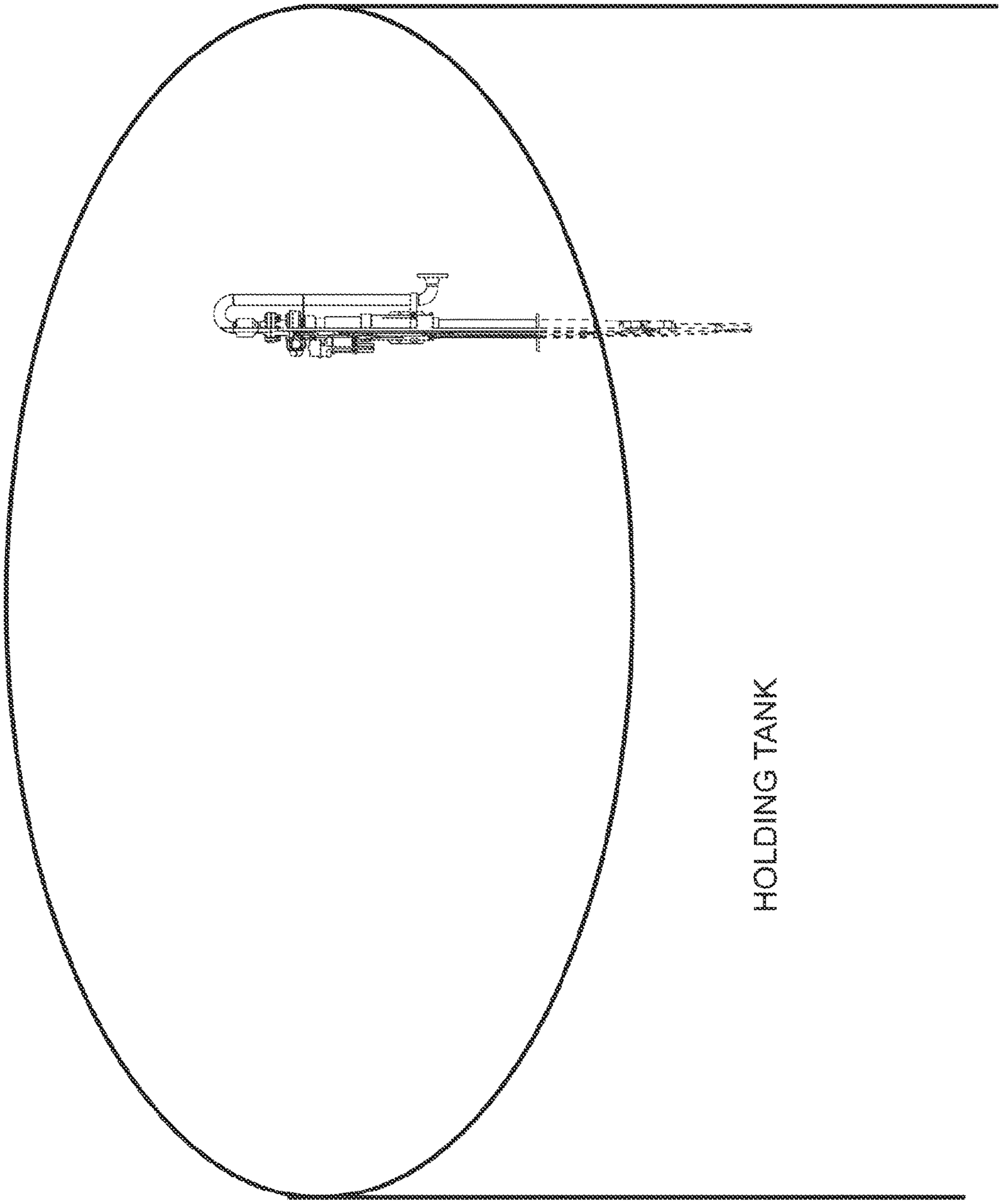
FIG. 10 is a downward-looking side perspective view showing an embodiment mounted on a roof of a holding tank.
Figure 11:
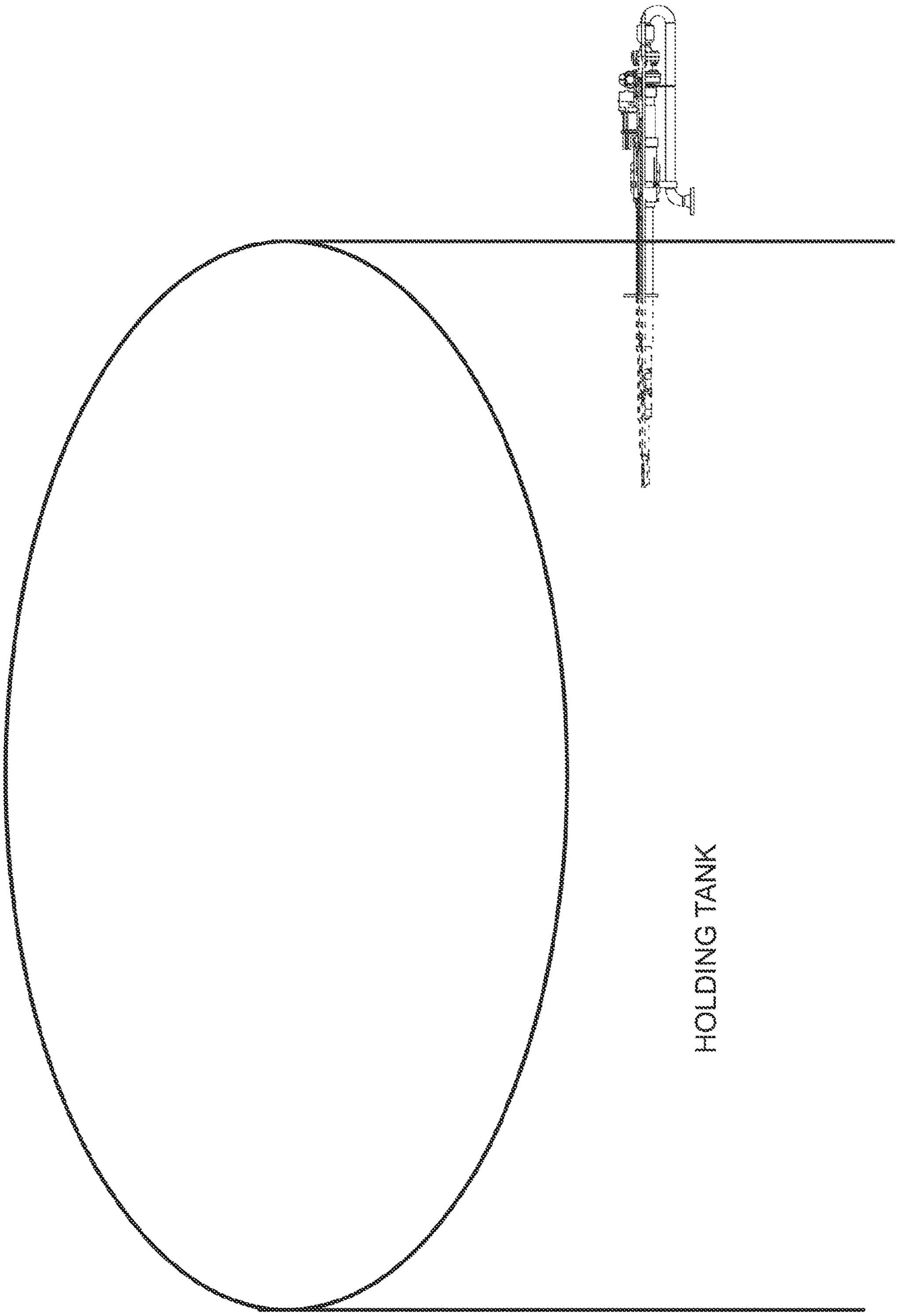
FIG. 11 is a downward-looking side perspective view showing an embodiment mounted on a sidewall of a holding tank.
Figure 12:
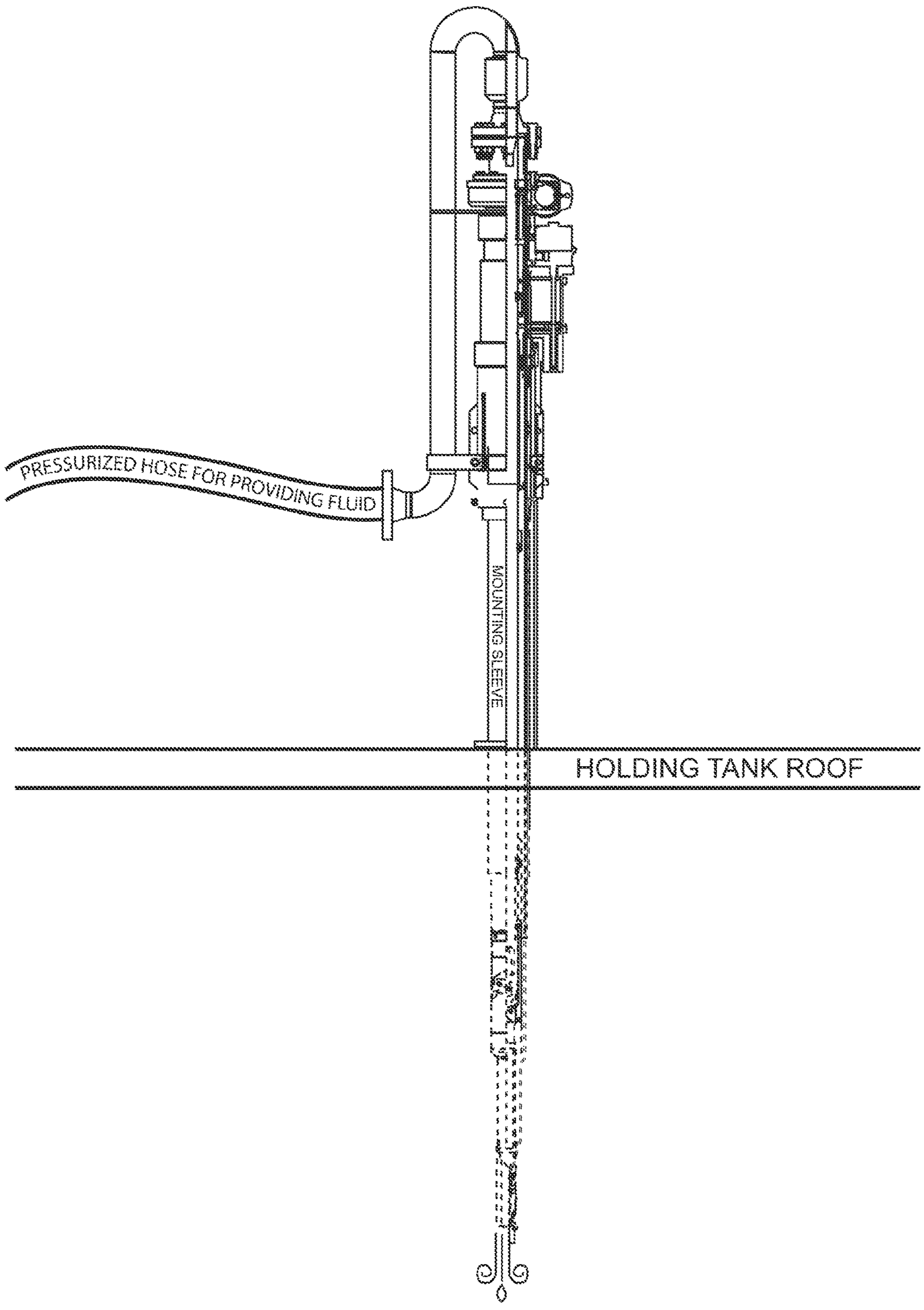
FIG. 12 is a partial cross-sectional side view of an embodiment in use and mounted on a roof of a holding tank.

As shown in FIGS. 10-12, apparatus 100 is configured to be mounted on a holding-tank roof or holding-tank sidewall. As a non-limiting example of how apparatus 100 is configured to be mounted on a holding-tank roof or holding-tank sidewall, the longitudinal length of primary fluid conduit 110 effectively allows nozzle 246 to enter into a holding tank to such a depth that nozzle 246 can effectively be aimed at a holding-tank interior surface for cleaning. And as identified in FIG. 12 as "MOUNTING SLEEVE", a mounting sleeve can be used to introduce apparatus 100 into the interior of a holding tank. Although a mounting sleeve is shown with frequency in the figures, embodiments are directed to apparatus 100 not including a mounting sleeve. Apparatus 100 can be mounted for use in a variety of ways, and use of a mounting sleeve is exemplary of just one embodiment. In another embodiment directed to demonstrating use of apparatus 100, a mounting sleeve separately pre-exits in a holding-tank rooftop or holding-tank sidewall; in those instances, apparatus can simply be inserted into the existing mounting sleeve for use. In other words, in embodiments, a mounting sleeve has been installed in a holding-tank rooftop or holding-tank sidewall, and in those instances, apparatus 100 can simply be inserted into the pre-installed mounting sleeve and used for cleaning purposes.

A controller, shown schematically as a computing system 700 in FIG. 16, can be operatively connected to the first motor 130 and/or the first motor-driven drive assembly 120 to adjust the swivel nozzle 200 and/or turn primary fluid conduit 110 a desired degree in a first and/or second direction about the primary-fluid-conduit longitudinal axis 112 as described herein. For example, embodiments of the computing system 700 can include electric processing circuitry 702 that executes computer-executable instructions, thereby activating the first motor 130 and/or the first motor-driven drive assembly 120 to turn the primary fluid conduit 110.

The computing system 700 of the embodiment in FIG. 16 is configured and/or programmed with one or more of the exemplary systems and methods described herein, and/or equivalents. As shown, the processing circuitry 702 is responsive to input instructions corresponding to operational states of the first motor 130 and/or the first motor-driven drive assembly 120, to control adjustment of a position, orientation, or other property of the primary fluid conduit 110 and, accordingly, the nozzle configuration 540 as described herein. For example, the input instructions can be included as a data structure pre-programmed and stored in a non-transitory, computer-readable medium 706 such as a SD card, hard disk drive, etc.; manually input by an operator during operation of the apparatus 100 via a network device 732 such as a user interface, which can optionally be included as part of the remote control 710, for example; correspond to control signals transmitted by an automated network device 732 such as one or more sensors (e.g., rotational position sensor 240) to be received by the processing circuitry 702, any combination thereof, or otherwise transmitted to the processing circuitry 702. According to other embodiments, the input instructions can include a defined routine that selectively, and optionally independently, establishes the pivotal position of the swivel nozzle 200 and/or the desired nozzle configuration 540 according to a defined program. Independent control can involve separately adjusting establish the pivotal position of the swivel nozzle 200 and/or the desired nozzle configuration 540. Further, establishing the pivotal position of the swivel nozzle 200 may not be dependent upon, or influence the adjustment of the nozzle configuration 540, allowing each to be separately controlled without dependence on the other. For example, the input instructions can include a defined routine that controls the position and/or orientation of the swivel nozzle 200 and nozzle configuration 540 to direct fluid over at least a portion (but less than all), and optionally all of an interior surface of a holding-tank roof and/or holding-tank sidewall as part of a defined (e.g., pre-determined) cleaning operation.

As an example, the processing circuitry 702 includes a processor 714, an integrated memory 716, and input/output ports 718 controlled by an input/output (I/O) interface 730 operably connected by a data bus 722. Examples of the processor 714 include, but are not limited to single or multi-processor architectures. The processing circuitry 702 can include circuitry of a rotational controller 704, a pivot controller 720 and a nozzle-tip-angle controller 708 that, in conjunction with nozzle positioning logic 726, controls a position and/or orientation of the primary fluid conduit 110, swivel nozzle 200 and/or the nozzle configuration 540 as described herein. A camera/light controller 724 can also optionally be included as part of the processing circuitry 702. The camera/light controller 724 can be operatively connected to control operation of the camera 300 and/or lighting source 310 in accordance with instructions included as a portion of the nozzle positioning logic 726, for the illumination and capture of images of interior portions of the holding tank.

The nozzle positioning logic 726 may be implemented in hardware, a computer-readable medium with stored instructions that are executable by the processor 714, firmware, and/or combinations thereof. While the nozzle positioning logic 726 is illustrated as a hardware component in communication with the rotational controller 704, pivot controller 720 and the nozzle-tip-angle controller 708, it is to be appreciated that in other embodiments, the nozzle positioning logic 726 could be implemented in the processor 714, stored in memory 716, or stored in a remote computer-readable medium 706 or other electronic storage device that is separate from, but operatively connected to the processing circuitry 702. For embodiments including the remote computer-readable medium 706, the computer-readable medium 706 may be operably connected to the processing circuitry 702 via, for example, an input/output (I/O) interface 730, which includes one or more of the input/output ports 718 (e.g., SD card slot, disc drive, USB port, etc.).

The processing circuitry 702 described above can be integrated with, and form a portion of the apparatus 100, coupled to the apparatus 100 and protected within a weather resistant case, etc. As another example, nozzle positioning logic 726 and/or the processing circuitry 702 can constitute a means (e.g., structure: hardware; non-transitory, computer-readable medium; firmware; etc.) for performing the actions described herein that is remotely located, but operatively connected to the apparatus 100 via a suitable communication channel (e.g., any wireless or hard-wired channel). Examples of such embodiments include, but are not limited to processing circuitry 702 configured as a server or other terminal operating in a cloud computing system, such as a smartphone, laptop, desktop, tablet computing device, and so on, that remotely transmits control instructions to the first motor 130 and/or the first motor-driven drive assembly 120 for adjusting the direction of fluid spray. Such means may be implemented, for example, as an application-specific integrated circuit ("ASIC"), programmed to receive relative or absolute positional data for controlling the primary fluid conduit 110, swivel nozzle 200 and/or the nozzle configuration 540, parse positional data input via the remote control 710 and/or computer-readable medium 706 to generate the corresponding control instruction that, when executed, drives the first motor 130 and/or the first motor-driven drive assembly 120 as described herein. As another example, the means may also be implemented as stored computer-executable instructions that are presented to processing circuitry 702 as data 728 from a remote source over a communication network, that are temporarily stored in memory 716 and then executed by processor 714. Examples of the communication network include, but are not limited to, a local area network ("LAN"), a wide area network ("WAN"), and other networks.

The processing circuitry 702 may interact with one or more of the network devices 732 via the I/O interfaces 730 and the input/output ports 718. Input/output devices may be, for example, any type of user interface that allows an operator to input a command for controlling the primary fluid conduit 110, swivel nozzle 200 and/or the nozzle configuration 540. According to some embodiments, examples of the I/O devices 732 include, but are not limited to, a keyboard, a microphone, a pointing and selection device, joystick, cameras, video cards, displays, the computer-readable medium 706, other devices operatively connected to the processing circuitry 702 via a communication network, and so on. The input/output ports 718 may include, for example, serial ports, parallel ports, USB ports, wireless communication channels (e.g., Bluetooth radios, IEEE 802.1x compliant radios, etc).

In one or more embodiments, the disclosed methods or their equivalents are performed by either: computer hardware configured to perform the method; or computer instructions embodied in a module stored in computer-readable medium 706 where the instructions are configured as an executable algorithm configured to perform the present processes when executed by at least a processor of the processing circuitry 702.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" and "memory," as used herein, refer to a non-transitory medium that stores instructions and/or data configured to perform one or more of the disclosed functions when executed by at least a processor. Data may function as instructions in some embodiments. A computer-readable medium 706 and memory 716 may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium 706 and memory 716 may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can retrieve and store data and/or instructions. Each type of media, if selected for implementation in one embodiment, may include stored instructions of an algorithm configured to perform one or more of the disclosed and/or claimed functions.

"Logic," as used herein, represents a component that is implemented with computer or electrical hardware (e.g., computer-readable medium 706 and/or memory 716), a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

What is claimed is:

1. Apparatus for cleaning a surface with a liquid jet, the apparatus comprising:

a primary fluid conduit having a longitudinal axis and two ends, a fluid-intake end and a fluid-exit end;

a first motor-driven drive assembly configured to engage the primary fluid conduit and turn the primary fluid conduit about the primary-fluid-conduit longitudinal axis;

a first motor configured to engage the first motor-driven drive assembly;

a section of the primary fluid conduit being inside of an adjacent penetration sleeve;

a section of the penetration sleeve being inside of a piston sleeve;

the piston sleeve configured to engage the penetration sleeve and move the penetration sleeve back and forth along a penetration-sleeve linear path over a primary-fluid-conduit exterior surface;

an actuator configured to engage the piston sleeve and move piston sleeve back and forth along the piston-sleeve linear path;

a penetration-sleeve end being attached to an extension sleeve that has a first end and a second end;

the extension-sleeve second end being attached to a swivel rod that has a first end and a second end;

the primary-fluid-conduit fluid-exit end being attached to a fixed nozzle having a first end and a second end;

the fixed-nozzle second end being attached to a swivel nozzle;

the swivel-rod second end being attached to the swivel nozzle;

the swivel nozzle configured to pivot between a fully extended position and a fully retracted position as the swivel rod respectively extends and retracts as the penetration sleeve moves back and forth;

the swivel nozzle being attached to a nozzle pipe;

the nozzle pipe being attached to a nozzle configuration that is configured to open and close a flapper door having a fluid exit orifice; and a continuous fluid-flow channel that extends from the primary-fluid-conduit fluid-intake end through the swivel nozzle.

2. The apparatus of claim 1, further comprising a rotational controller configured to independently rotate the primary fluid conduit about the primary-fluid-conduit longitudinal axis by engaging the first motor, and a pivot controller configured to independently pivot the swivel nozzle by engaging the actuator.

3. The apparatus of claim 1, wherein the nozzle configuration has a hydraulic piston that is configured to open and close the flapper door by engaging a linkage element.

4. The apparatus of claim 3, further comprising a nozzle configuration controller configured to open and close the flapper door by engaging the hydraulic piston.

5. The apparatus of claim 1, wherein the first motor is a hydraulic motor.

6. The apparatus of claim 1, wherein the actuator is a piston actuator.

7. The apparatus of claim 1, wherein the apparatus further comprises a rotational position sensor that is configured to sense a rotational position of the primary fluid conduit.

8. The apparatus of claim 1, wherein the continuous fluid-flow channel extends from the primary-fluid-conduit fluid-intake end through the nozzle configuration.

9. The apparatus of claim 1, wherein the continuous fluid-flow channel includes at least one non-linear section.

10. The apparatus of claim 1, wherein the first motor-driven drive assembly is a gear assembly.

11. The apparatus of claim 1, wherein the degree of pivot differential between the fully extended position and the fully retracted position is at least 100 degrees.

12. The apparatus of claim 1, wherein the degree of pivot differential between the fully extended position and the fully retracted position is at least 40 degrees.

13. The apparatus of claim 1, wherein the degree of pivot differential between the fully extended position and the fully retracted position is at least 5 degrees.

14. The apparatus of claim 1, wherein the nozzle pipe is non-linear.

15. The apparatus of claim 1, wherein the nozzle pipe has at least 5 degrees of bend.

16. The apparatus of claim 1, wherein the actuator is hydraulic.

17. The apparatus of claim 1, wherein the apparatus further comprises a camera and a lighting element.

* * * * *